United States Patent [19]

Stuart et al.

[11] 3,875,515

[45] Apr. 1, 1975

[54] AUTOMATIC EQUALIZER WITH DECISION DIRECTED FEEDBACK

[75] Inventors: Richard L. Stuart, Beltsville; Steven A. Tretter, Silver Spring, both of Md.

[73] Assignee: Rixon Inc., Silver Spring, Md.

[22] Filed: June 19, 1973

[21] Appl. No.: 371,510

[52] U.S. Cl. .................. 325/323, 325/42, 333/18 R, 178/88

[51] Int. Cl. .............................................. H03k 5/18

[58] Field of Search ........................... 325/323–326, 325/42, 65; 328/162–164; 179/15 AE; 178/88; 333/18, 28 R, 70 T

[56] References Cited

UNITED STATES PATENTS

| | | | |
|---|---|---|---|
| 3,597,541 | 8/1971 | Proakis et al. | 325/42 |
| 3,614,622 | 10/1971 | Holsinger | 325/42 |
| 3,696,203 | 10/1972 | Leonard | 325/324 |
| 3,764,914 | 10/1973 | Karvaugh | 333/18 X |
| 3,792,356 | 2/1974 | Kobayashi et al. | 325/323 X |

*Primary Examiner*—Benedict V. Safourek
*Assistant Examiner*—Aristotelis M. Psitos
*Attorney, Agent, or Firm*—Larson, Taylor & Hinds

[57] ABSTRACT

An automatic equalizer for use in digital data modems employs decision directed feedback to cancel the intersymbol interference caused by symbols which have already been decoded. In an equalizer using a minimum mean-square-error algorithm the channel impulse reponse of each decoded symbol is subtracted from the delay line to effectively eliminate the effects thereof. Two schemes for impulse response identification are disclosed.

9 Claims, 2 Drawing Figures

AUTOMATIC EQUALIZER WITH DECISION DIRECTED FEEDBACK

FIELD OF THE INVENTION

The present invention relates to automatic equalizers for digital data communication systems.

BACKGROUND OF THE INVENTION

There has been a great deal published in recent years on the design of receivers for digital data transmission through channels wherein intersymbol interference limits the transmission rate. Much of the literature directed to implementation of a practical receiver is concerned with an adaptive receiver which is capable of high-speed signaling over band-limited channels and which basically comprises a tapped delay line filter with automatically adjustable gain at each tap. One popular technique employing such a filter involves adjusting the tap gains of the filter to minimize the mean-square error due to the combination of intersymbol interference and additive noise. Another approach concerns the use of quantized feedback to provide the complete cancellation of the intersymbol interference due to the trailing portion of the received pulse using decisions made regarding previously decoded symbols and measurements of the pulse response of the channel, the intersymbol interference caused by previous pulses being subtracted from the present pulse. Reference is made to the following articles for a good discussion of the prior art as well as an extensive bibliography of other work done in this field: Proakis et al., *An Adaptive Receiver for Digital Signaling Through Channels With Intersymbol Interference*, IEEE Transactions on Information Theory, VOL. IT–15, No. 4, JULY 1969 and George et al., *An Adaptive Decision Feedback Equalizer*, IEEE Transactions on Communication Technology, VOL COM–19, No. 3, JUNE 1971.

SUMMARY OF THE INVENTION

In accordance with the invention, an automatic equalizer for use in digital data modems and the like is provided which employs decision directed feedback to cancel intersymbol interference caused by already decoded symbols. The equalizer of the invention cancels the intersymbol interference before equalization rather than after and effectively subtracts out both future and past effects of a decoded symbol rather than just the future effects as is the case with the prior art techniques discussed above. This approach eliminates the distortion caused by intersymbol interference beforehand and enables a better estimate of symbol presently being decoded. More generally, the feedback provided increases the eye opening of the equalizer, resulting in a smaller error rate and in some cases permitting operation over channels where the equalizer would normally fail.

According to a preferred embodiment thereof, the invention is incorporated in an equalizer which comprises a tapped delay line wherein a minimum mean-square-error adjustment algorithm is utilized, the equalizer adjusting the tap gains $C_1, \ldots, C_N$ of a tapped delay line to drive to zero the correlation between the error $B_n - Bl$ and the data $E_1, \ldots E_N$, where $B_n$ is the transmitted symbol, $$Bl = \sum_{\ell=1}^{N} C_\ell E_{N-\ell+1}$$

is the linear estimate of $B_n$, and $E_l, \ldots, E_N$ is the data in the delay line. Since $B_n$ is not known in practice, an estimate thereof is provided by slicing Bl to the nearest symbol level, $\hat{B}_n$, and it is this estimate that is fed back to be subtracted from the tapped delay line. The estimated symbol $\hat{B}_n$ is multiplied by estimates of the channel impulse response at each tap and each result subtracted from the data at the corresponding tap. With $\hat{B}_n$ equal to the transmitted symbol $B_n$, the intersymbol interference is reduced thereby resulting in a more open "eye."

Two different techniques for impulse response identification are provided. In a first of these, the impulse response sample for a given tap is estimated as $$Q_{N-j} = \frac{1}{SM} \sum_{\ell=1}^{M} E_{N-j}(\ell) B(\ell) \text{ for } j = 0 \ldots N-1,$$

where S is the average data power and M is the number of symbols. In a preferred approach, the signal power need not be known and correlation can be provided with only a few bits or using polarity correlation. Specifically, in accordance with the second approach, the estimated impulse response samples are up-dated each time a new symbol is received by a term proportional to their error. The quantity $\alpha E_{N-j}(n+1)\hat{B}_n$ is used to estimate the error, $\alpha$ being a parameter which is chosen to control the speed and precision of estimation. The parameter $\alpha$ is preferably varied during operation from a large value which provides relatively rapid convergence to a small valve which provides precise estimates.

Other features and advantages of the invention will be set forth in, or apparent from, the detailed description of the preferred embodiments found hereinafter.

DESCRIPTION OF THE PREFERRED EMBODIMENTS

Figure 1:
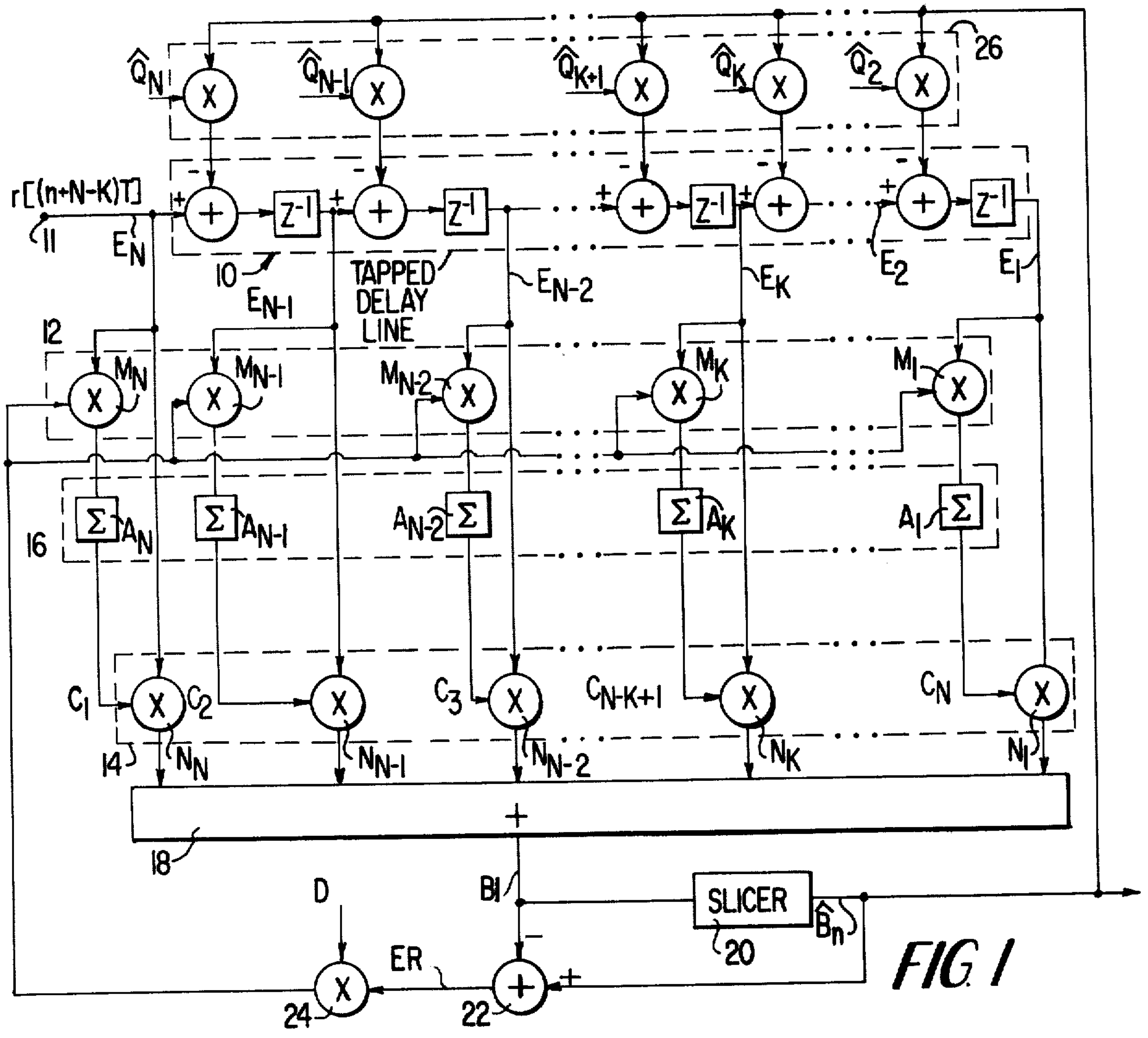
FIG. 1 is a schematic circuit diagram of a generalized automatic equalizer incorporating the invention.

Referring to FIG. 1, an automatic equalizer is shown which employs decision-directed feedback to cancel the intersymbol interference caused by previously decoded symbols. The automatic equalizer basically comprises a tapped delay line (TDL) which is generally denoted 10 and is formed by series of blocks labeled $Z^{-1}$. The received data enters the delay line 10 at an input terminal denoted 11 (and marked $r[(n+N-K)T]$ for reasons which will be apparent later) and progresses down the delay line 10, each block $Z^{-1}$ providing a delay of T seconds, where T is the symbol period. Considering the received or input signal, it is assumed that the channel from baseband input to baseband output can be modelled by a linear time invariant system with band limited noise added to the output. The output is sampled at the symbol rate and thus the sampled channel output is $$\sum_{k=1}^{N} Q_k B_{n+K-k} + W(nT)$$

where $r(nT)$ is the received signal, $B_n$ is the input symbol at time $nT$, $\{Q_K\}_{K=1}^{N}$ are the channel impulse response samples, $w(nT)$ is the noise sample and T is, as stated, the symbol period. The data stored at the taps of delay line 10 is denoted $E_N, E_{N-1}, E_{N-2} \ldots E_K \ldots E_2, E_1$ as indicated and normally the timing is adjusted so that the tap $E_K$ is the center of delay line 10 and corresponds to the transmitted symbol $B_n$.

The taps of delay line 10 are connected to the inputs of first and second multipliers, with output of tap $E_N$ connected to the inputs of multipliers $M_N$ and $N_N$ and the outputs of remaining taps being similarly connected to the inputs of respective pairs of multipliers $M_{N-1}, M_{N-2}, M_{N-3} \ldots M_K \ldots M_2, M_1$ (collectively denoted 12) and $N_{N-1}, N_{N-2}, N_{N-3} \ldots N_K \ldots N_2, N_1$ (collectively denoted 14), as indicated. The second input to multipliers 12 is derived as discussed hereinbelow and the outputs are connected to a corresponding accumulator $A_N, A_{N-1}, A_{N-2} \ldots A_K \ldots A_2, A_1$ (collectively denoted 16 and represented by the conventional symbol $\Sigma$), as indicated. The outputs of accumulators 16 form the second inputs to the multipliers 14. The outputs of multipliers 14 are summed in a summing network or summer 18. The output, B1, of summer 18 is connected to a slicing circuit or slicer 20 and to one input of an adder 22. The output of slicer 20, which represents B1 quantized to the nearest allowed transmitted level $\hat{B}_n$, forms the second input to adder 22 and the output, ER, of the latter represents the difference between $\hat{B}_n$ and B1.

To backtrack for a moment, it can be shown that given the data $E_1, \ldots, E_N$ stored in a delay line, then $$B1 = \sum_{i=1}^{N} C_i \; E_{N-i+1}$$

is the linear minimum mean-square-error estimate of the transmitted symbol $B_n$ if the error $B_n - B1$ is uncorrelated with the data $E_1, \ldots, E_N$, and $C_1, \ldots, C_N$ are the tap gains of the delay line. In the operation of the equalizer formed by circuitry discussed above, the tap gains $C_1, \ldots, C_N$ are adjusted to drive the correlation to zero. This is done using the error signal $ER = \hat{B}_n - B1$ which is fed back to form the second input to each of the multipliers 12. As stated hereinabove the outputs of multipliers 12 are connected through associated accumulators 16 to the inputs of corresponding multipliers 14, the outputs of accumulators $A_1, A_2, \ldots, A_K, \ldots, A_l$ corresponding to tap gains $C_1, C_2, \ldots, C_{N-K+1}, \ldots, C_N$, respectively. The gradient of the mean-square-error with respect to central tap $C_K$ is the average value of $E_K \times (B_n - B1)$. In practice, $B_n$ is not known at the receiver and is estimated by slicing B1 to the nearest symbol level $\hat{B}_n$ as mentioned above. Initially the taps of delay line 10 are set so that $C_K = 1$ and all other gains are zero. Subsequently, at each unit in time, the tap gains of delay line 10 are incremented by the scaled noisy estimate of the negative gradient $D \times E_k \times ER$ for $k=1, \ldots, N$. The parameter D is a scale factor which is used to scale down the error signal ER and to control the accuracy and convergence rate of the tap gains $C_1, \ldots, C_N$. As indicated in FIG. 1, the parameter D forms one input of a multiplier 24 connected to the ER output of adder 22 and it is the output of multiplier 24 which is connected to multipliers 12.

The circuitry described so far is conventional and reference is made to the Proakis et al article referred to above for a further discussion of adaptive equalizers which minimize the mean square error (MSE).

In accordance with an important feature of the present invention, once a symbol has been detected the impulse response of that symbol is subtracted from the tapped delay line 10. This is done by feeding back the $\hat{B}_n$ output of slicer circuit 20 as shown in FIG. 1. As illustrated, this output forms one input for each a plurality of multipliers $P_N, P_{N-1} \ldots P_{K+1}, P_K \ldots P_2$ which are collectively denoted 26. The second inputs to multipliers 26, which are denoted $\hat{Q}_N, \hat{Q}_{N-1}, \ldots, \hat{Q}_{K+1}, \hat{Q}_K, \ldots, \hat{Q}_2$, are estimates of the channel impulse response. The outputs of the multipliers 26 are subtracted from the delay line 10 as indicated in FIG. 1 by the adder circuits 28 connected between the blocks $Z^{-1}$. In terms of the input data, channel impulse response, and estimated impulse response, the data in the delay line at tap N-j is $$E_{N-j}(n) = \sum_{i=1}^{N-j} Q_i B_{n+N-j-i} + \sum_{i=N-j+1}^{N} [Q_i B_{n+N-j-i} - \hat{Q}_i \hat{B}_{n+N-j-i}] + w((n+N-j-K)T) \text{ for } j=1,\ldots,N-1 \text{ and } E_N = \sum_{i=1}^{N} Q_i B_{n+N-i} + w((n+N-K)T).$$

Assuming that the equalizer is operating well so that $\hat{B}_n = B_n$, the equations become $$E_{N-j}(n) = \sum_{i=1}^{N-j} Q_i B_{n+N-j-i} + \sum_{i=N-j+1}^{N} [Q_i - \hat{Q}_i] B_{n+N-j-i} + w((n+N-j-K)T) \text{ and } E_N(n) = \sum_{i=1}^{N} Q_i B_{n+N-i} + w((n+N-K)T) \text{ for } i=1,\ldots,N-1.$$

If $B_n$ is correlated against $E_{N-j}(n)$, it follows $\epsilon\{E_{N-j}(n)B_n\} = Q_{N-j}$ S where $\epsilon$ denotes statistical averaging and $S = \epsilon\{B_n^2\}$ is the average data power. Thus, the impulse response samples can be estimated as $$Q_{N-j} = \frac{1}{SM} \sum_{l=1}^{M} E_{N-j} \cdot \mathbf{KBI\,(k)}$$

for $j=0, \ldots, N-1$.

Therefore, to estimate the impulse response sample for a given delay line tap, the data at that tap is correlated against the detected data $\hat{B}_n$. If $B_n$ has been estimated correctly and the impulse response estimate is accurate, the intersymbol interference due to $B_n$ will be eliminated in detecting future data. This will, of course, result in more open eye pattern.

Figure 2:
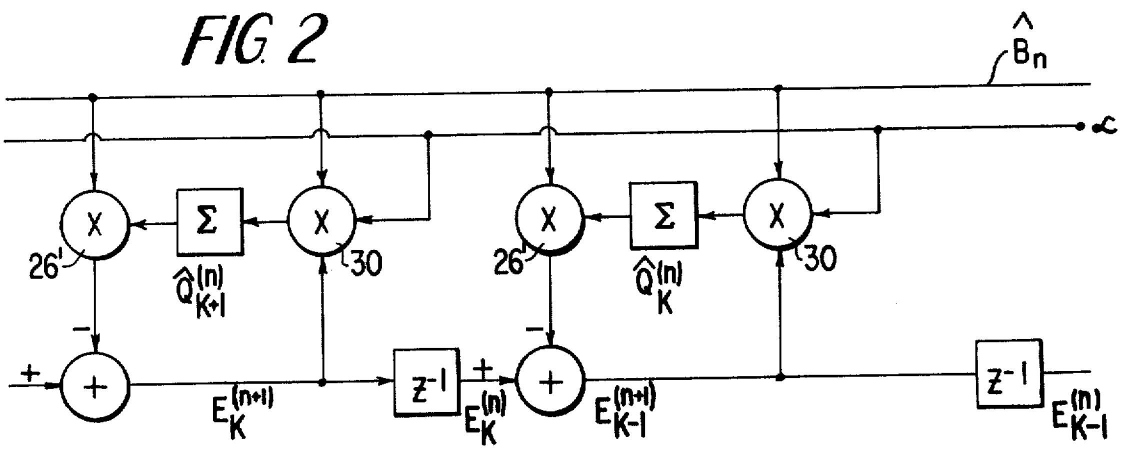
FIG. 2 is a schematic circuit diagram of a preferred embodiment of the circuitry used in estimating the channel impulse response.

Referring to FIG. 2, an alternate approach to the impulse response identification scheme described hereinabove is shown. This approach has several advantages as compared with that described above in connection with FIG. 1. Specifically, the impulse response identification approach previously described requires that a large number of sumbols, M, be received before an estimate can be made. Further, more symbols must be received before a new estimate is made. In addition, the signal power S, must be known and analog or multi-bit correlation must be used to produce accurate estimates. In the approach illustrated in FIG. 2, the estimated impulse response samples are up-dated each time a new symbol is received. The quantity, S, representing the signal power, is not used and correlation can be provided with only a few bits or, alternatively, polarity correlation can even be used.

As set forth, with the equalizer operating well so that $\hat{B}_n = B_n$, the data in the delay line at tap N−j is given by the equation $$E_{N-j}(n) = \sum_{i=1}^{N-j} Q_i B_{n+N-j-i} + \sum_{i=N-j+1}^{N} (Q_i - \hat{Q}_i) B_{n+N-j-i} + w(n+N-j-K)$$

or $$E_{N-j}(n+1) = \sum_{i=1}^{N-j} Q_i B_{n+1+N-j-i} + (Q_{N-j+1} - \hat{Q}_{N-j+1}) B_n + \sum_{i=N-j+2}^{N} (Q_i - \hat{Q}_i) B_{n+1+N-j-i} + w(n+1+N-j-K).$$

Since the data is an uncorrelated sequence it follows that $\epsilon\{E_{N-j}(n+1)\ B_n\} = S(Q_{N-j+1} - \hat{Q}_{N-j+1})$, where $\epsilon$ represents statistical averaging and $S=\epsilon\{B_n^2\}$ as above, since all other terms become zero with statistical averaging. From the expression given it can be seen that the error between the actual impulse response sample $Q_{N-j+1}$ and the estimated impulse response sample $\hat{Q}_{N-j+1}$ is proportional to the correlation between $E_{N-j}(n+1)$ and the data symbol $B_n$. The quantity $E_{N-j}(n+1)\ \hat{B}_n$ is a noisy estimate of the true correlation. To estimate the error, let $\hat{Q}_n(n)$ be the estimate of $Q_k$ at the time $n$, so that the estimation scheme is $\hat{Q}_{N-j+1}(n+1) = \hat{Q}_{N-j+1}(n) + \alpha\ E_{N-j}(n+1)\ \hat{B}_n$ for $j=1, \ldots, N-1$. The philosophy here is to increment each present impulse sample estimate by a term proportional to the error after each symbol is received and the term $\alpha E_{N-j}(n+1)\ \hat{B}_n$ is a noisy estimate of the required increment. The quantity $\alpha$ determines the speed and precision of estimation.

Referring specifically to FIG. 2, the approach discussed above is implemented using a further series of multipliers 30. Multipliers 30 form the product $\alpha E_{N-j}(n+1)\ \hat{B}_n$ from the inputs shown. The outputs of multipliers 30 are connected through corresponding accumulators 32 to multipliers 26', which correspond to multipliers 26 of FIG. 1 and are similarly connected to receive the $\hat{B}_n$ output of slicer 20. With this arrangement, the impulse response sample estimates are thus incremented by the term $\alpha E_N(n+1)\ \hat{B}_n$, which is proportional to the error, after each error symbol is received, as set forth above.

The quantity $\alpha$, which, as stated, controls the speed and precision of estimation, is chosen as desired. Small values of $\alpha$ provide slow convergence but the steady state estimates are precise. On the other hand, for large values of $\alpha$, the convergence is rapid but highly variable steady state estimates are produced. The estimates tend to converge to their steady state values exponentially in time with $\alpha$ determining the time constant. To obtain rapid, precise estimates, the quantity $\alpha$ can be chosen large initially and then changed to a small value. For example, it has been indicated that with $\alpha = 0.01$ for the first 1,000 received signals and $\alpha = 0.001$ for the next 2,000 additional received symbols, accurate identification is achieved. It is noted that it may be desirable to "shift gears" in this manner, i.e., between high and low values, more than once.

The first estimation scheme described for the channel impulse samples requires nearly analog correlation for true identification. The approach just described is based on incrementing the estimates in the direction of the error. Crude correlation can be used instead of precise correlation to find the polarity of the error although at the penalty of slower convergence. In fact, polarity correlation, i.e., sign $E_{N-j}(n+1)$ sign $\hat{B}_n$ can be used and this can be implemented using simple binary devices.

Although the invention has been described relative to exemplary embodiments thereof, it will be understood by those skilled in the art that variations and modifications can be effected in these embodiments without departing from the scope and spirit of the invention.

We claim:

1. An automatic equalizer for the receiver of a digital data system, said equalizer comprising a tapped delay line having an input connected to receive the baseband output of the receiver demodulator, and a plurality of outout taps; means for combining the outputs at the output taps of the delay line at the symbol time to produce an output B1; means for quantizing the output B1 to the nearest transmitted level $\hat{B}_n$ where $B_n$ is the symbol transmitted at time $n$T and T is the symbol period; and feedback means including multiplying means for multiplying the $\hat{B}_n$ output of the quantizing means with estimated impulse response samples for each tap of the delay line and means for subtracting the output of each multiplying means from the data at the corresponding tap of the delay line to cancel the intersymbol interference caused by the decoded symbol on the future decoded symbol.

2. An automatic equalizer as claimed in claim 1 further comprising means for controlling the gain at each of the taps of said delay line, comparison means for comparing B1 with $\hat{B}_n$ to produce an error signal and means for connecting the error signal output of said comparison means back to the tap gain controlling means.

3. An automatic equalizer as claimed in claim 2 further comprising multiplying means for multiplying said error signal with a further parameter to control the convergence rate and accuracy of the error signal.

4. An automatic equalizer as claimed in claim 3 wherein said tap gain controlling means comprises a first plurality of multipliers each having a first input connected to a corresponding tap of the delay line and a second input connected to the output of said multiplying means; a like plurality of accumulators each connected to the output of a corresponding one of said first plurality of multipliers; and a second plurality of multipliers each having a first input connected to a corresponding tap of the delay line and a second input connected to the output of a corresponding said accumulator.

5. An automatic equalizer as claimed in claim 1 wherein correlating means are provided at each tap comprising means for estimating samples by correlating the data at that tap against the detected data signal $\hat{B}_n$, in accordance with the expression $$\hat{Q}_{N-j} = \frac{1}{SM} \sum_{l=1}^{M} E_{N-j}(l) B_l$$

for $j=0, \ldots, N-1$, where $Q_{N-j}$ is the impulse response at the tap N−j and S is the average data power, M is the number of symbols and $E_{N-j}$ is data in the tap N−j.

6. An automatic equalizer as claimed in claim 1 further comprising correlating means at each tap comprising means for incrementing the present impulse response sample estimate with a term proportional to the error after each symbol is received.

7. An automatic equalizer as claimed in claim 6 wherein said correlating means increments the present impulse response sample estimate using a noisy estimate $\alpha E_{N-j}(n+1) \hat{B}_n$ where $\alpha$ is a control parameter.

8. An automatic equalizer as claimed in claim 7 wherein the correlating means at the tap containing the data $E_K(n)$ comprises a first multiplier having a first input connected to receive the input $E_{K-1}(n+1)$, a second input connected to receive the control parameter $\alpha$ and a third input connected to receive the detected data signal $\hat{B}_n$, an accumulator connected to the output of said first multiplier, and a second multiplier having a first input connected to receive the detected data signal $\hat{B}_n$, and a second input connected to the output of said accumulator the output of said second multiplier being subtracted from the data $E_K(n)$ at that tap.

9. An automatic equalizer as claimed in claim 8 where $\alpha$ is varied to control the rate of convergence and precision of the steady state estimates.

* * * * *